United States Patent [19]

Nielsen

[11] 3,789,405

[45] Jan. 29, 1974

[54] AUTOMATIC STEP ELIMINATOR CIRCUIT TO PREVENT RADAR JAMMING

[75] Inventor: Alan H. Nielsen, Pompton Plains, N.J.

[73] Assignee: The United States of America as represented by the Secretary of the United States Air Force, Washington, D.C.

[22] Filed: Mar. 29, 1972

[21] Appl. No.: 238,706

[52] U.S. Cl............................................ 343/18 E
[51] Int. Cl. ........................ G01s 7/36, G01s 9/02
[58] Field of Search........................ 343/5 GC, 18 E

[56] References Cited
UNITED STATES PATENTS 3,281,837  10/1966  VanHijfte.......................... 343/18 E
3,495,244  2/1970  LaRosa ............................. 343/5 GC

*Primary Examiner*—Malcolm F. Hubler

[57] ABSTRACT

An automatic step eliminator circuit to prevent radar jamming is provided wherein the voltage applied to the AGC input of one IF amplifier of a tracking radar is sampled in two parallel sample and hold amplifiers which are instructed by a signal developed by the onset of jamming so that the normal target signal is stored in one channel and the electronic countermeasure (ECM) signal in another. The outputs of both channels are added to develop continuous error signals. The error detector of the tracking radar then receives signals recovered from both jamming and target during alternate intervals and therefor continuously.

3 Claims, 7 Drawing Figures

PATENTED JAN 29 1974          3,789,405
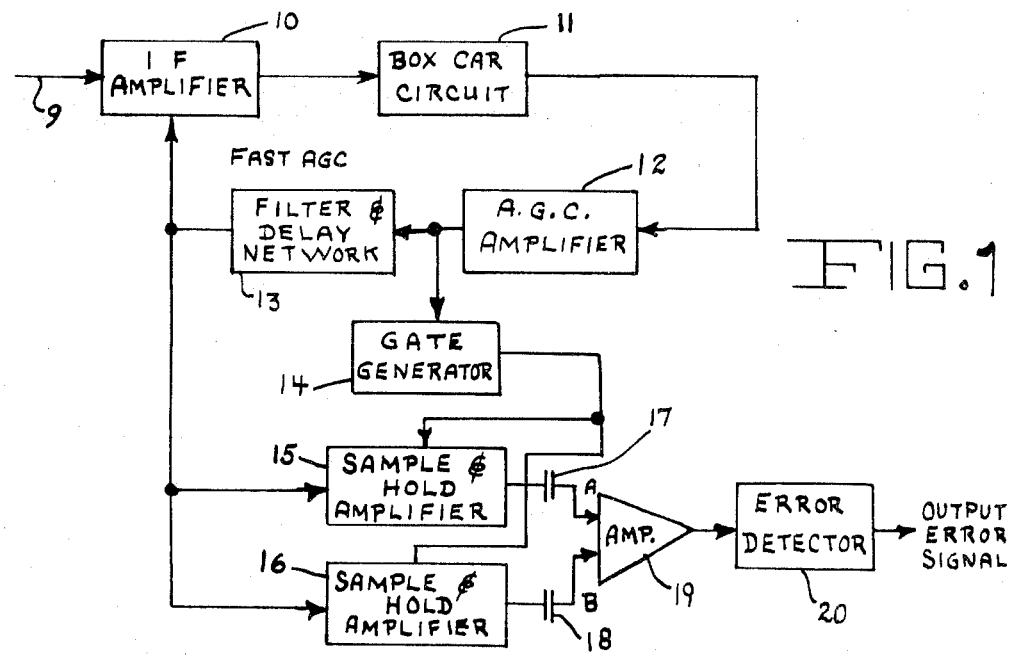
FIG.1
FIG.2A  IF SIGNAL
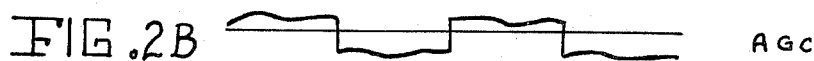
FIG.2B  AGC
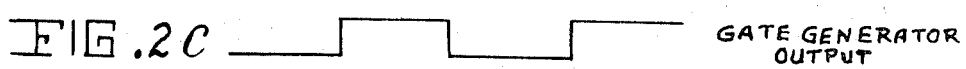
FIG.2C  GATE GENERATOR OUTPUT
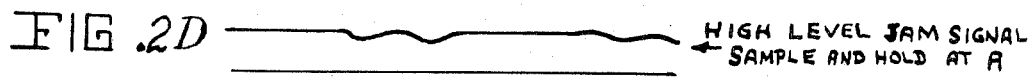
FIG.2D  HIGH LEVEL JAM SIGNAL SAMPLE AND HOLD AT A
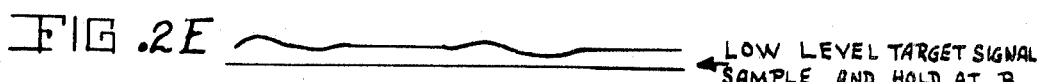
FIG.2E  LOW LEVEL TARGET SIGNAL SAMPLE AND HOLD AT B
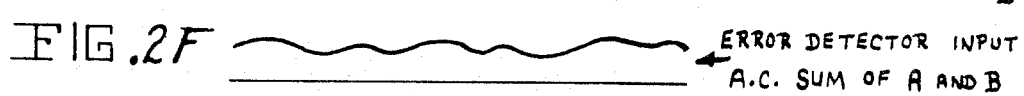
FIG.2F  ERROR DETECTOR INPUT A.C. SUM OF A AND B

AUTOMATIC STEP ELIMINATOR CIRCUIT TO PREVENT RADAR JAMMING

BACKGROUND OF THE INVENTION

This invention relates to a circuit to prevent jamming of a tracking radar, and more particularly to a step eliminator circuit to remove a step signal resulting from interfering signals.

Countdown is an ECM (electronic countermeasure) technique which denies angle tracking error information to the radar. This is accomplished by providing large amplitude rectangular modulation on top of the target signal. This modulation occurs at a frequency to which the AGC (automatic gain control) loop in the radar cannot respond, and at a duty cycle which causes the signal to become saturated when the ECM is on and to become very small when the ECM is off. Very little error modulation can be recovered by the radar angle tracking circuits and the radar antenna drifts due to the bias and angle track is lost. The radar receiver includes boxcar circuitry associated with the aforementioned AGC loop. The countdown jamming, in the prior art, also resulted in a step in the box car output and also resulted in transients. The detrimental effects of the transients are primarily due to the box car circuitry being unable to pass peak amplitudes resulting therefrom. The result is that circuitry even if designed to avoid recovery problems will limit and reduce loop gain and introduce periodic loop errors. The step eliminator of the present invention reduces the transients markedly and the aforementioned step in the box car output caused by the countdown jaming is removed before the box car signal is presented to the azimuth and elevation phase detectors of the radar.

The step eliminator of the present invention is used with either fast AGC of the radar receiver or Log IF. Log IF has a disadvantage of noise and noise jamming susceptibility particularly for range tracking radars. The AGC loop responds to any deceptive jamming waveform as well as normal signals. A necessary condition for successful operation of the above-mentioned form of ECM is the capture of the radar AGC loop by an ECM signal which is larger than the target signal. Thus the present invention is utilized to prevent capture of the tracking radar by the aforesaid countermeasure signal.

SUMMARY OF THE INVENTION

An automatic step eliminator circuit to prevent jamming in a tracking radar is provided. The step eliminator circuit is used with either a fast AGC loop or log IF amplifier to eliminate a step signal resulting from electronic countermeasure signals directed to the tracking radar. The fast AGC loop is associated with the tracking radar IF amplifier. The AGC loop responds to any deceptive jamming waveforms as well as normal signals. The voltage applied to the AGC input of the IF amplifier is sampled in two parallel AC coupled output sample and hold amplifiers. The sample and hold amplifiers are instructed by a square wave developed by the onset of jamming from a gate generator so that the normal target signal is stored in one channel and the ECM signal in another. The outputs of both channels are added to develop continuous error signals. The error detector of the tracking radar then receives signals recovered from both jamming and target during alternate intervals and therefor continuously.

An object of this invention is to provide an automatic step eliminator circuit to prevent jamming of a tracking radar by an electronic countermeasure signal.

Another object of this invention is to provide an automatic step eliminator circuit to prevent jamming of a tracking radar and to eliminate transients resulting from jamming signals.

DESCRIPTION OF DRAWINGS

FIG. 1 shows partly in block form and partly in diagrammatic form a preferred embodiment of the invention;

FIG. 2A illustrates the IF signal;

FIG. 2B illustrates the AGC signal;

FIG. 2C shows the gate generator output signal;

FIG. 2D shows the sample and hold amplifier signal of channel A;

FIG. 2E shows the sample and hold amplifier signal of channel B; and

FIG. 2F shows the error detector input signal.

DETAILED DESCRIPTION OF THE PREFERRED EMBODIMENT

Now referring in detail to FIG. 1, there is shown conventional IF amplifier 10, normally utilized in a tracking radar, which receives by way of line 9 a target signal of interest which is utilized to obtain error signals for use by the radar angle tracking circuits. The IF signal is the waveform shown in FIG. 2A. Conventional box car circuit 11 receives the target signal (and also the jamming signal) from IF (intermediate frequency) amplifier 10 and supplies a signal to AGC (automatic gain control) amplifier 12. Filter and delay network 13 interconnects AGC amplifier 12 and IF amplifier 10 completing the AGC loop and as illustrated in the waveform of FIG. 2B, supplying the required gain control voltage signal to IF amplifier 10. It is noted that IF amplifier 10 is arranged to be gain controlled. The AGC loop is of the type conventionally used in tracking radars and is vulnerable to the hereinbefore described jamming signals.

The automatic step eliminator circuit of the present invention is most effective in eliminating the effects of the jamming. The step eliminator is comprised of gate generator 14, amplifier 19, channel A consisting of sample and hold amplifier 15 and capacitor 17, and channel B consisting of sample and hold amplifier 16 and capacitor 18. The output signal from AGC amplifier 12 is fed to gate generator 14 providing in response thereto an instruction waveform as shown in FIG. 2C which is simultaneously received by sample and hold amplifiers 15 and 16 also receiving simultaneously as an input signal the output signal from filter and delay network 13.

The output signals from sample and hold amplifiers 15 and 16 are AC coupled to summing amplifier 19 by way of capacitors 17 and 18, respectively. The output waveforms of channel A and B are illustrated in FIGS. 2D and 2E, respectively. The input signal to error detector 20 is received from summing amplifier 19 and is the waveform illustrated in FIG. 2F.

It is emphasized that the AGC loop responds to any deceptive jamming waveforms as well as normal target signals. The voltage applied to the AGC input of amplifier 10 is sampled in two parallel AC coupled output sample and hold amplifiers. As is seen in the waveforms of FIG. 2, the AGC voltage swings over a range caused by jamming. Sample and hold amplifiers 15 and 16 are instructed by a square wave developed by the onset of jamming from gate generator 14 so that the normal target signal is stored in one channel and the ECM signal in the other. The aforesaid onset of jamming triggers gate generator 14 on. The end of said jamming triggers gate generator 14 off. This operation is conventional. The output voltage from gate generator 14 is shown at 2C. Sample and hold amplifiers may be conventionally actuated at virtually any desired level. Accordingly, for low level target signal, sample and hold amplifier 16 is operative at one level of the gate generator output and alternately sample and hold amplifier 15 is operative at another level representative of the high level jamming signal. The DC component is not of material interest and so the outputs are AC coupled and added. Since the switching occurs prior to the onset of the change in signal level by virtue of the delay in the AGC amplifier, there are no transients in either channel A or B. The A and B channel outputs are shown as waveforms in FIGS. 2D and 2E, respectively. These are added to develop continuous error signals and the addition eliminates the alternate lack of error signals. Error detector 20 then receives signals due to either jamming or target.

What is claimed is:

1. An automatic step eliminator circuit to prevent tracking radar jamming comprised of an intermediate frequency amplifier having a gain control input and a signal input, said intermediate amplifier receiving a normal target signal and a jamming signal by way of said signal input, a box car circuit receiving the output signal from said intermediate frequency amplifier, an automatic gain amplifier, a filter and delay network, said automatic gain amplifier receiving the output from said box car circuit and providing an output signal for reception by said filter and delay network, said gain control input of said intermediate amplifier receiving an actuating signal from said filter and delay network, a gate generator receiving an actuating signal from said automatic gain control amplifier to provide a square wave instruction signal in response thereto, first and second sample and hold amplifiers simultaneously receiving said square wave instruction signal, said first and second sample and hold amplifiers also simultaneously receiving input signals from said filter and delay network, said sample and hold amplifiers being controlled by said square wave instruction signal to store said normal target signal in said first sample and hold amplifier and said jamming signal in said second sample and hold amplifier, means to sum the output signals from said first and second sample and hold amplifiers to provide a continuous resultant signal to eliminate the alternate lack of an error signal, and error detector means receiving said continuous resultant signal.

2. An automatic step eliminator circuit as described in claim 1 further including first and second capacitor means to couple the output signals from said first and second sample and hold amplifiers, respectively, to said summing means.

3. An automatic step eliminator circuit as described in claim 1 wherein said summing means consists of a summing amplifier.

* * * * *